United States Patent [19]

Swikle et al.

[11] Patent Number: 5,146,620
[45] Date of Patent: Sep. 8, 1992

[54] ONE-PIECE, LIGHT CONDUCTING GASKET

[75] Inventors: Todd G. Swikle, Chicago; Carl V. Novak, Pell Lake, both of Ill.

[73] Assignee: Motorola, Inc., Schaumburg, Ill.

[21] Appl. No.: 545,012

[22] Filed: Jun. 28, 1990

[51] Int. Cl.⁵ .............................................. H04B 1/08
[52] U.S. Cl. ...................................... 455/351; 439/490
[58] Field of Search ................ 455/343, 347, 351, 89, 455/90, 128; 320/48; 340/815.15, 691; 439/489, 490

[56] References Cited

U.S. PATENT DOCUMENTS

| 4,111,516 | 9/1978 | Wireman | 439/490 |
| 4,225,970 | 9/1980 | Jaramillo et al. | 455/89 |
| 4,671,597 | 6/1987 | Grill | 439/490 |
| 4,719,322 | 1/1988 | Guzik et al. | 455/351 |
| 4,953,198 | 8/1990 | Daly et al. | 455/32 |
| 5,007,857 | 4/1991 | Wright | 439/490 |

FOREIGN PATENT DOCUMENTS 0089843 4/1989 Japan ...................... 455/89

OTHER PUBLICATIONS

LEDs in Gasket Indicate Solenoid Power Status, Machine Design, Apr. 26, 1990, p. 46.

Primary Examiner—Curtis Kuntz
Assistant Examiner—Edward Urban
Attorney, Agent, or Firm—Kenneth W. Bolvin

[57] ABSTRACT

The preferred embodiment of the present invention is comprised of a translucent, flexible silicone material having two receptacles (101 and 102) molded into one side and an opening (103), connecting to one of the receptacles (101), in a second side. When the present invention is mounted in a radiotelephone, the opening (103) matches with an opening (201) in the radiotelephone housing and seals around the opening in the radiotelephone. The first receptacle (101) accepts a power connector (204) mounted on a printed circuit board while the other receptacle accepts a power indication LED (203). The opening (103) in the second side of the present invention allows another power connector to mate with the connector (204) within the first receptacle and supply power to the radiotelephone. The translucent nature of the present invention transmits light from the LED to the outside of the present invention and therefore to the outside of the radiotelephone through an opening (202) near the power connector opening.

5 Claims, 1 Drawing Sheet

ONE-PIECE, LIGHT CONDUCTING GASKET

FIELD OF THE INVENTION

The present invention relates generally to the fields of environmental seals and light conducting material.

BACKGROUND OF THE INVENTION

To simplify construction of electronic devices, manufacturers typically design as many of the components on the printed circuit board as possible. This presents a problem as to connectors and power indication lights. These components typically have to be mounted on the device housing in order to environmentally seal the components against the device housing.

Gaskets are frequently used to protect electronics, internal to an electronic device, from environmental elements such as water. An example of such a use is a microphone gasket in a radio to allow sound to reach the microphone but not allow water and other contaminants to get inside the radio housing. This is accomplished by inserting the gasket into a space slightly smaller than the gasket. The flexibility of the gasket permits it to fit the smaller enclosure and, once inserted, to expand and press against the walls of the enclosure, thereby sealing the housing interior from the environment. There is a resulting need for an apparatus to allow mounting of the connector and power indication light, such as a light emitting diode (LED), on the printed circuit board while environmentally sealing the electronic device.

SUMMARY OF THE INVENTION

The preferred embodiment of the present invention is comprised of a translucent, flexible silicone material having two receptacles molded into one side and an opening, connecting to one of the receptacles, in a second side. The first receptacle accepts a power connector mounted on a printed circuit board while the other receptacle accepts an LED. The opening in the second side of the present invention allows a connector to mate with the connector within the first receptacle and supply power to the radiotelephone. The translucent nature of the present invention conducts light outside of the present invention.

When installed in a radiotelephone, the present invention allows both the power connector and the power indication LED to be mounted on the radiotelephone's printed circuit board. The power connector and LED fit into the two receptacles in the present invention which in turn fits into the radiotelephone housing. The present invention seals around the power connector and power indication openings in the radiotelephone housing.

DETAILED DESCRIPTION OF THE PREFERRED EMBODIMENT

The present invention enables both a power connector and a power indication light to be mounted on the printed circuit board in an electronic device while environmentally sealing the device. The present invention also acts as a light conductor to conduct the light from the power indication LED to the outside of the device.

Figure 1:
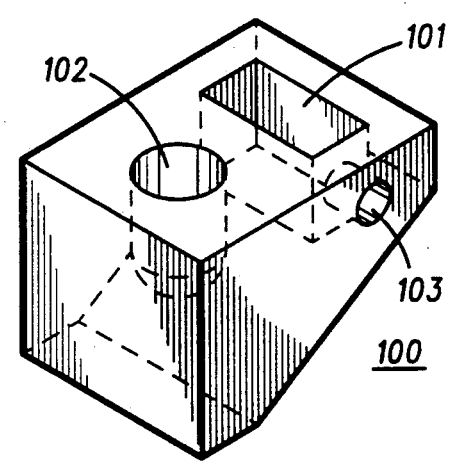
FIG. 1 shows the preferred embodiment of the present invention.
Figure 2:
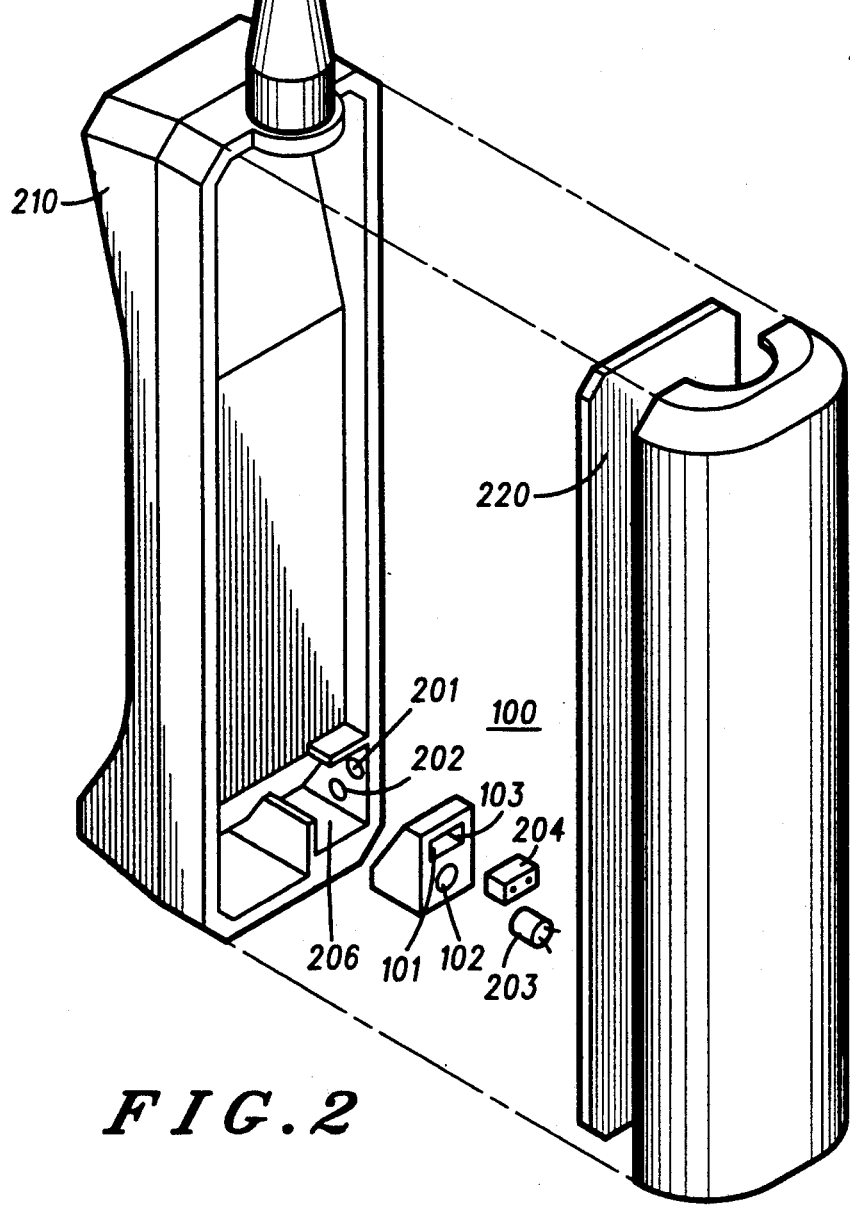
FIG. 2 shows an application of the preferred embodiment of the present invention.

In the preferred embodiment of the present invention, the gasket (100) in FIG. 1, is comprised of translucent silicone and is shaped to fit into a small pocket (206) within a radiotelephone (200), as illustrated in FIG. 2. Additionally, the present invention includes a rectangular receptacle (101) molded into one side to accept a connector (204) and another receptacle (102), in the same side, to accept a light source (203). In the preferred embodiment, the connector (204) is a power connector and the light source (203) is an LED. An opening (103) through a second side, that is substantially perpendicular to the first side, connects to the power connector receptacle (101).

In the preferred embodiment of the present invention, the gasket (100) is used in a radiotelephone (200). Two openings (201 and 202) in the side of the radiotelephone (200) open into a pocket (206): the first opening (201) is for the power connector (204) to mate with an outside power connector and the other opening (202) allows light through that the gasket (100) has conducted from the power indication LED (203). Both of these components (203 and 204) are mounted on the radiotelephone's printed circuit board (220).

When the present invention is inserted into the pocket (206) in the radiotelephone housing (210), it expands and presses against the sides of the pocket (206), thereby sealing the two openings (201 and 202) in the side of the housing (210). The printed circuit board (220) is mounted within the radiotelephone housing (210) with the power connector (204) and LED (203) facing the present invention. These components fit into their respective receptacles (101 and 102) in the present invention which then seals around the components (203 and 204). The translucent material of the present invention conducts the light from the LED (203) to a lens in the opening (202) in the side of the radiotelephone housing (210).

Alternate embodiments of the present invention could substitute other light sources in place of the LED, such as incandescent or fiber optic, and other translucent materials, such as neoprene or other elastomers, in place of the silicone. Additionally, alternate embodiments could have the light source and connector receptacles (102 and 101) located in different sides of the gasket (100) or all three openings (101, 102, and 103) in one side. It is also possible to have more than one light source receptacle or more than one connector receptacle with connecting opening. An example of such an embodiment could use one color light source for power connection and another color for internal switching indication.

In summary, the present invention allows the power connector and power indication LED, indicating power is being supplied to the radiotelephone, to be mounted on the printed circuit board, thereby reducing manufacturing costs. The present invention provides, in a single unit, an environmental seal around the power connector openings and light conducting capability.

We claim:

1. A one-piece, light-conducting, gasketing apparatus for a device having internal connecting means and lighting means, the internal connecting means having the ability to couple to external connecting means through a first opening in the device, the lighting means emitting light through a second opening in the device, the apparatus comprising:

a translucent material having a resilient property to seal the first and second openings;

a first receptacle in the material, having at least five sides, for receiving the internal connecting means, the first receptacle having a hole through a first side of the at least five sides and extending through the apparatus; and a second receptacle in the material for receiving the lighting means.

2. The apparatus of claim 1 wherein the apparatus is comprised of translucent silicone.

3. A one-piece, light-conducting, gasketing apparatus for a device having internal connecting means and lighting means, the internal connecting means having the ability to couple to external connecting means through a first opening in the device, the lighting means emitting light through a second opening in the device, the apparatus comprising:

a translucent material having a resilient property to seal the first and second openings;

a plurality of receptacles in the material, the internal connecting means and the lighting means each being received by a separate receptacle; and at least one opening through the apparatus, each opening coupled to at least one receptacle to allow insertion of the external connecting means to mate with the internal connecting means.

4. The apparatus of claim 3 wherein the apparatus is comprised of translucent silicone.

5. A communication device substantially contained within a housing having a plurality of openings, a first opening accepting external power means and a second opening allowing light to exit the device, the device comprising:

connecting means substantially opposite the first opening in the housing;

internal lighting means for producing the light that exists the second opening; and a one-piece, light conducting gasket comprising:

a resilient, translucent material;

a first receptacle in the material, having at least five sides, for receiving the connecting means, the first receptacle also having a hole through a first side of the at least five sides and extending through the apparatus, the hole being adjacent to the first opening in the housing; and a second receptacle in the material for receiving the internal lighting means.

* * * * *